United States Patent
Chhabra et al.

(10) Patent No.: US 10,158,500 B2
(45) Date of Patent: Dec. 18, 2018

(54) G.8032 PRIORITIZED RING SWITCHING SYSTEMS AND METHODS

(71) Applicant: Ciena Corporation, Hanover, MD (US)

(72) Inventors: Mukesh Chhabra, New Delhi (IN); Piyush Sharma, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 122 days.

(21) Appl. No.: 15/334,449

(22) Filed: Oct. 26, 2016

(65) Prior Publication Data

US 2018/0076976 A1    Mar. 15, 2018

(30) Foreign Application Priority Data

Sep. 13, 2016 (IN) .............................. 201611031175

(51) Int. Cl.
| | |
|---|---|
| *H04L 12/437* | (2006.01) |
| *H04L 12/707* | (2013.01) |
| *H04L 12/713* | (2013.01) |
| *H04L 12/24* | (2006.01) |

(52) U.S. Cl.
CPC ........ *H04L 12/437* (2013.01); *H04L 41/0668* (2013.01); *H04L 45/22* (2013.01); *H04L 45/586* (2013.01)

(58) Field of Classification Search
CPC ... H04L 12/437; H04L 41/0668; H04L 45/22; H04L 45/586
See application file for complete search history.

(56) References Cited

U.S. PATENT DOCUMENTS

| | | |
|---|---|---|
| 8,203,932 B2 | 6/2012 | Cheung et al. |
| 2003/0165119 A1* | 9/2003 | Hsu ........................ H04L 12/437 370/258 |
| 2004/0090965 A1* | 5/2004 | Lin ........................ H04L 45/302 370/395.21 |
| 2009/0168647 A1 | 7/2009 | Holness et al. |
| 2013/0258840 A1 | 10/2013 | Holness et al. |

(Continued)

OTHER PUBLICATIONS

ITU-T Q9—SG 15, G.8032, Ethernet Ring Protection Overview, Mar. 2008, pp. 1-23.

(Continued)

*Primary Examiner* — Zhensheng Zhang
(74) *Attorney, Agent, or Firm* — Clements Bernard Walker PLLC; Christopher L. Bernard; Lawrence A. Baratta, Jr.

(57) ABSTRACT

A prioritized G.8032 ring switching systems and methods implemented in a node include receiving a defined priority level for each of a plurality of virtual rings at the node, wherein the priority level is one of N levels of priority, N being an integer; and, responsive to a link failure that affects the plurality of virtual rings, performing G.8032 traffic restoration in order based on each of the N levels of priority, wherein each set of the plurality of virtual rings at a same defined priority level are processed concurrently to minimize hardware access. The plurality of virtual rings can be processed concurrently through flushing their Forwarding Databases at a same time for each of the set on a per virtual ring basis. The receiving is via a Ring Automated Protection Switching (R-APS) Protocol Data Unit (PDU) for each virtual ring with the defined priority level included therein.

17 Claims, 11 Drawing Sheets

(56) References Cited

U.S. PATENT DOCUMENTS

| | | | |
|---|---|---|---|
| 2013/0294226 A1* | 11/2013 | Lim | H04L 69/40 370/225 |
| 2014/0064060 A1 | 3/2014 | Kulambi | |
| 2015/0207668 A1* | 7/2015 | Civil | H04L 41/0654 370/223 |
| 2016/0191302 A1 | 6/2016 | Tsubota | |

OTHER PUBLICATIONS

Marc Holness, Metro Ethernet—History and Overview, The Greater Chicago Chapter SCTE, Ciena Corporation, May 22, 2013, pp. 1-45.

Jeong-dong Ryoo et al., Ethernet Ring Protection for Carrier Ethernet Networks, IEEE Communications Magazine, Sep. 2008, pp. 136-143.

ITU-T, Telecommunication Standardization Sector of ITU, G.8032/Y.1344, Ethernet ring protection switching, Jun. 2008, pp. 1-46.

ITU-T, Telecommunication Standardization Sector of ITU, G.8032/Y.1344, Ethernet ring protection switching, Feb. 2012, pp. 1-104.

ITU-T, Telecommunication Standardization Sector of ITU, G.8032/Y.1344, Ethernet ring protection switching, Aug. 2015, pp. 1-82.

* cited by examiner

G.8032 PRIORITIZED RING SWITCHING SYSTEMS AND METHODS

CROSS-REFERENCE TO RELATED APPLICATION(S)

The present patent application/patent claims the benefit of priority of Indian Patent Application No. 201611031175, filed on Sep. 13, 2016, and entitled "G.8032 PRIORITIZED RING SWITCHING SYSTEMS AND METHODS," the contents of which are incorporated in full by reference herein.

FIELD OF THE DISCLOSURE

The present disclosure generally relates to networking systems and methods. More particularly, the present disclosure relates to ITU-T G.8032/Y.1344 prioritized ring switching systems and methods.

BACKGROUND OF THE DISCLOSURE

Ethernet Ring Protection Switching (ERPS) is described, for example, in ITU-T Recommendation G.8032/Y.1344 (February 2012 and August 2015), the contents of which are incorporated by reference. G.8032v1 supported a single ring topology and G.8032v2 supports multiple rings/ladder topology. As described herein, G.8032 is used to refer to ERPS and the various incarnations of ITU-T Recommendation G.8032/Y.1344. By virtue of its topology, ring based networks, which have learning and flooding on the Layer 2 Ethernet domain, are prone to data packet loops. G.8032 is based on a scheme in which loop-avoidance is the most important criterion as far as protocol specification is concerned. G.8032 allows multiple "virtual" rings (VR) to be present on network elements (i.e., ring nodes) that form a closed loop (i.e., a logical ring). Each virtual ring (associated with the logical ring) has independent control frames (i.e., control planes) that need to be transmitted to manage the protection switching function of the "virtual" ring.

Traffic restoration in G.8032 involves implementing a ring block on a failed link, flushing Forwarding Databases (FDB), i.e., a Layer 2 Media Access Control (MAC) table, and generating signaling for a Signal Fail (SF) to notify other nodes in the virtual ring of the failed link. Assuming a node, network element, switch, etc. (collectively referred to as a "node" or "nodes") operates a plurality of virtual rings, traffic restoration in G.8032 at the node is conventionally performed in a non-ordered manner where the node does not guarantee any particular virtual ring is restored in any particular order, i.e., different virtual rings will implement the traffic restoration steps above concurrently without individual virtual rings being specifically ordered by the node. Disadvantageously, this non-ordered manner does not account for different priorities of services on the virtual rings as well as results in overall longer restoration times since flushing the FDB in a non-ordered manner requires flushing per individual virtual ring, resulting in multiple flushes which are slow operations.

BRIEF SUMMARY OF THE DISCLOSURE

In an exemplary embodiment, a prioritized G.8032 ring switching method implemented in a node includes receiving a defined priority level for each of a plurality of virtual rings at the node, wherein the priority level is one of N levels of priority, N being an integer; and, responsive to a link failure that affects the plurality of virtual rings, performing G.8032 traffic restoration in order based on each of the N levels of priority, wherein each set of the plurality of virtual rings at a same defined priority level are processed concurrently to minimize hardware access. The set of the plurality of virtual rings can be processed concurrently through flushing their Forwarding Databases at a same time for each of the set on a per virtual ring basis. The receiving can be via a Ring Automated Protection Switching (R-APS) Protocol Data Unit (PDU) for each virtual ring with the defined priority level included therein. The R-APS PDU can include a flag indicative of a last virtual ring in the set, and wherein the node is configured to perform the traffic restoration for all of the set subsequent to receiving the R-APS PDU from the last virtual ring.

The node can be adjacent to the link failure, and the performing can include installing a channel block on a link with the link failure for each virtual ring affected by the link failure; generating a Ring Automated Protection Switching (R-APS) Protocol Data Unit (PDU) for each virtual ring in a first priority level with the defined priority level included therein and including a flag in a last R-APS PDU for a last virtual ring in the first priority level; flushing a Forwarding Database for each virtual ring in the first priority level concurrently in a single operation; and repeating the generating and the flushing for each additional priority level in order. The node can be non-adjacent to the link failure, and the performing can include removing a channel block on any associated link if provisioned for each virtual ring affected by the link failure; retransmitting any messages indicating the link failure for each virtual ring affected by the link failure towards a Ring Protection Link (RPL) node if the node is not the RPL node; subsequent to the receiving indicating a last virtual ring in a set of virtual rings at a set priority level, flushing a Forwarding Database for each virtual ring in the set priority level concurrently in a single operation. The set of the plurality of virtual rings can be processed concurrently to minimize hardware access to flush a Forwarding Database in a one or more of a Network Processor, an Application Specific Integrated Circuit, and a Field Programmable Gate Array. One or more of the plurality of virtual rings can be in one or more Link Aggregation Groups (LAGs).

In another exemplary embodiment, a prioritized G.8032 ring switching apparatus in a node includes circuitry adapted to receive a defined priority level for each of a plurality of virtual rings at the node, wherein the priority level is one of N levels of priority, N being an integer; and circuitry adapted to perform G.8032 traffic restoration in order based on each of the N levels of priority responsive to a link failure that affects the plurality of virtual rings, wherein each set of the plurality of virtual rings at a same defined priority level are processed concurrently to minimize hardware access. The set of the plurality of virtual rings can be processed concurrently through flushing their Forwarding Databases at a same time for each of the set on a per virtual ring basis. The circuitry adapted to receive can utilize a Ring Automated Protection Switching (R-APS) Protocol Data Unit (PDU) for each virtual ring with the defined priority level included therein. The R-APS PDU can include a flag indicative of a last virtual ring in the set, and wherein the circuitry adapted to perform can be configured to perform the traffic restoration for all of the set subsequent to receiving the R-APS PDU from the last virtual ring.

The node can be adjacent to the link failure, and the circuitry adapted to perform can be adapted to install a channel block on a link with the link failure for each virtual ring affected by the link failure, generate a Ring Automated Protection Switching (R-APS) Protocol Data Unit (PDU) for each virtual ring in a first priority level with the defined priority level included therein and including a flag in a last R-APS PDU for a last virtual ring in the first priority level, flush a Forwarding Database for each virtual ring in the first priority level concurrently in a single operation, and repeat generation and flushing for each additional priority level in order. The node can be non-adjacent to the link failure, and the circuitry adapted to perform can be adapted to remove a channel block on any associated link if provisioned for each virtual ring affected by the link failure, retransmit any messages indicating the link failure for each virtual ring affected by the link failure towards a Ring Protection Link (RPL) node if the node is not the RPL node, and, subsequent to receiving an indication of a last virtual ring in a set of virtual rings at a set priority level, flush a Forwarding Database for each virtual ring in the set priority level concurrently in a single operation. The set of the plurality of virtual rings can be processed concurrently to minimize hardware access to flush a Forwarding Database in a one or more of a Network Processor, an Application Specific Integrated Circuit, and a Field Programmable Gate Array.

In a further exemplary embodiment, a node adapted to perform prioritized G.8032 ring switching includes a plurality of ports adapted to switch packets between one another; and a controller configured to receive a defined priority level for each of a plurality of virtual rings at the node on a port of the plurality of ports, wherein the priority level is one of N levels of priority, N being an integer, and perform G.8032 traffic restoration in order based on each of the N levels of priority responsive to a link failure on the port that affects the plurality of virtual rings, wherein each set of the plurality of virtual rings at a same defined priority level are processed concurrently to minimize hardware access. The set of the plurality of virtual rings can be processed concurrently through flushing their Forwarding Databases at a same time for each of the set on a per virtual ring basis. The controller can receive via a Ring Automated Protection Switching (R-APS) Protocol Data Unit (PDU) for each virtual ring with the defined priority level included therein. The node can be adjacent to the link failure, and the controller can be adapted to install a channel block on a link with the link failure for each virtual ring affected by the link failure, generate a Ring Automated Protection Switching (R-APS) Protocol Data Unit (PDU) for each virtual ring in a first priority level with the defined priority level included therein and including a flag in a last R-APS PDU for a last virtual ring in the first priority level, flush a Forwarding Database for each virtual ring in the first priority level concurrently in a single operation, and repeat generation and flushing for each additional priority level in order. The node can be non-adjacent to the link failure, and the controller can be adapted to remove a channel block on any associated link if provisioned for each virtual ring affected by the link failure, retransmit any messages indicating the link failure for each virtual ring affected by the link failure towards a Ring Protection Link (RPL) node if the node is not the RPL node, and, subsequent to receiving an indication of a last virtual ring in a set of virtual rings at a set priority level, flush a Forwarding Database for each virtual ring in the set priority level concurrently in a single operation.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to ITU-T G.8032/Y.1344 prioritized ring switching systems and methods. Specifically, the systems and methods provide ordered restoration at a node, network element, switch, etc. ("node") that operates a plurality of virtual rings. The ordered restoration can be via a configurable traffic restore priority assigned to each virtual ring. Signaling for traffic restoration via control frames such as Ring Automated Protection Switching (R-APS) Signal Fail (SF) requests can be generated for the plurality of virtual rings in order of priority. In an exemplary implementation, the systems and methods can utilize a new proprietary Type-Length-Value (TLV) in the R-APS Protocol Data Unit (PDU). Advantageously, the systems and methods improve protection switching times by reducing/minimizing the read/write operations on hardware as well as provide prioritized restoration for differentiated services.

Exemplary G.8032 Ring

Figure 1:
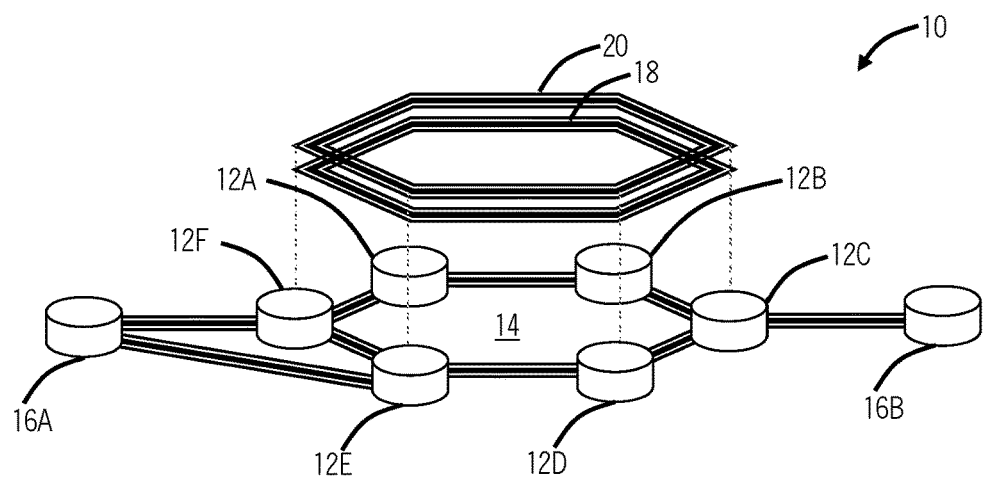
FIG. 1 is a network with nodes in a G.8032 ring providing Ethernet Ring Protection.

Referring to FIG. 1, in an exemplary embodiment, a network 10 is illustrated with nodes 12A-12F (collectively referred to herein as nodes 12) in a G.8032 ring 14 providing Ethernet Ring Protection. Also, the network 10 may include nodes 16A, 16B interconnected via the ring 14. The nodes 12, 16A, 16B may include optical switches, optical cross-connects, Optical Transport Network (OTN) switches with packet switching, Ethernet switches, routers, or any other device commonly known to forward data packets in a network. The nodes 12 are physically configured in a ring topology for illustration purposes although the nodes 12 may also be connected in other topologies such as a mesh. The G.8032 ring 14 is a logical construct that forms a closed loop over the physical network infrastructure, i.e., the G.8032 ring 14 may be over a physical ring topology as in FIG. 1 but also may be formed over a mesh topology.

The nodes 12 may utilize G.8032 Ethernet Ring Protection over the G.8032 ring 14 to provide rapid protection switching below 50 ms. Advantageously using G.8032, the G.8032 ring 14 and the node 12 may be client and server layer agnostic while using existing (and commodity) IEEE 802.1 (bridging) and IEEE 802.3 (MAC) hardware. Connections between adjacent nodes 12 in the G.8032 ring 14 (i.e., the ring spans) are assumed to be bi-directional, and may be a link, a Link Aggregation Group (LAG), or a subnet (e.g., Multiprotocol Label Switching (MPLS), Provider Backbone Bridge Traffic Engineering (PBB-TE), SONET/SDH, OTN, etc.). Also, the ring spans associated with the G.8032 ring 14 need not be the same bandwidth nor server layer technology. In Ethernet Ring Protection, a "virtual ring" (VR) is associated with the G.8032 ring 14 and each virtual ring includes two channels 18, 20—an R-APS channel 18 used for transport of ring control Protocol Data Units (PDUs) and a service data channel 20 used for transport of client data traffic.

Figure 2:
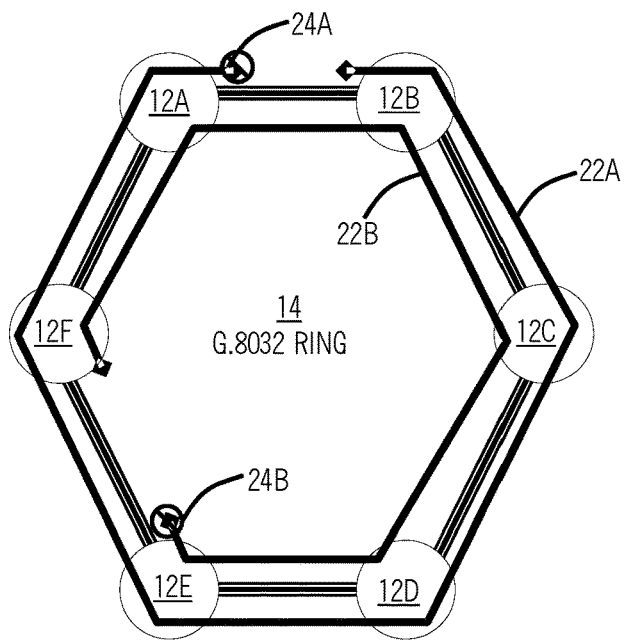
FIG. 2 is a network diagram if the G.8032 ring of FIG. 1 with two virtual rings provisioned thereon.

Referring to FIG. 2, in an exemplary embodiment, the G.8032 ring 14 is illustrated with two virtual rings 22A, 22B provisioned thereon. Each of the virtual rings 22A, 22B has a service data channel 20 providing client traffic flows over the G.8032 ring 14 that share a common provisioned channel block. Also, each client micro traffic flow may have a Virtual Local Area Network (VLAN) associated with it. Also, the multiple virtual rings 22A, 22B on a given ring cannot have an overlapping VLAN Identification (VID) space. Each of the virtual rings 22A, 22B also includes a channel block 24A, 24B (collectively referred to herein as a channel block 24) that prevents VLAN tagged traffic from being relayed/forwarded between [ring or client] ports. Thus, each of the virtual rings 22A, 22B includes an R-APS channel 18 and a service data channel 20. Each channel 18, 20 needs at least a single channel blocking point on the G.8032 ring 14, i.e. the channel block 24A, 24B. Using Ethernet Ring Protection, there is a central node called the Ring Protection Link (RPL) owner node which blocks, using the channel block 24, one of the ports, known as the RPL port, to ensure that no loop forms for the Ethernet traffic. Ring Automated Protection Switching (R-APS) messages are used to coordinate the activities of switching the RPL link on or off. Ethernet Shared Protection Ring (E-SPRing) is one instantiation, i.e. one embodiment, of the ERP standard.

Figure 3:
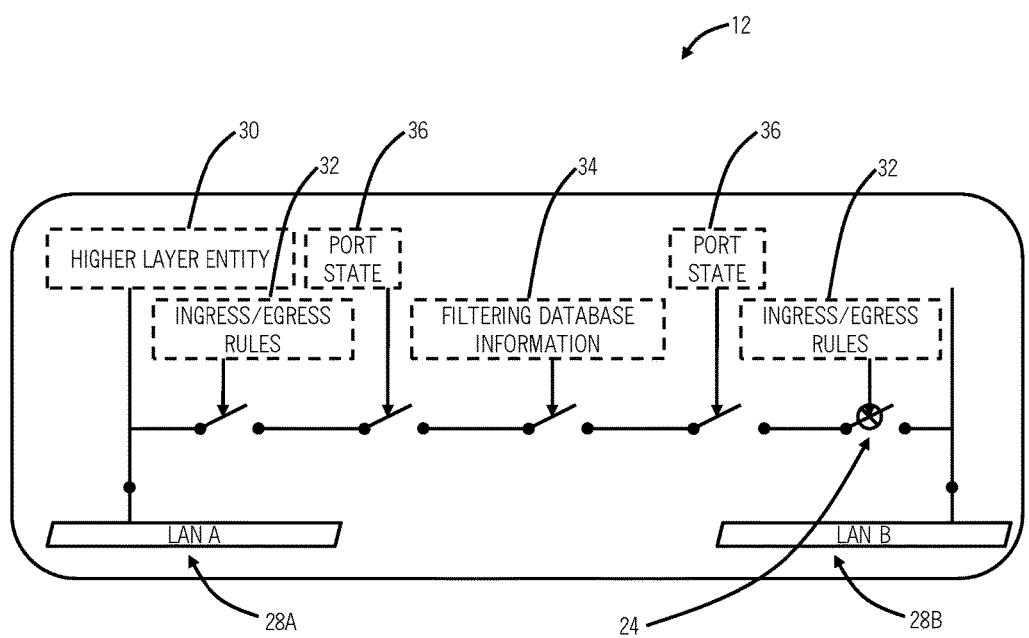
FIG. 3 is a functional block diagram of an exemplary channel block in a node.

Referring to FIG. 3, in an exemplary embodiment, a functional block diagram illustrates an exemplary channel block 24 in the node 12. The network element 12 is illustrated with two exemplary ports 28A, 28B (referred to a LAN A and LAN B). The network element 12 may include higher level entities 30, ingress/egress rules 32, port state 36, and a filtering database information 34. The channel block 24 function prevents traffic from being forwarded by the receive ring port. However, it does not prevent traffic from being received by the higher level entities 30 (e.g., G.8032 Engine) on the network element 12. In an exemplary embodiment, the channel block 24 may be realized by ingress/egress rules 32 placed on a [virtual] ring port 28. The following Channel block rules should be applied such that each of the channels 18, 20 must have at least a [single] channel block 24 installed (at all times) and the location of the "provisioned" channel block 24 (associated with the Ring Protection Link) is [currently] operator determined.

G.8032 Failure and Recovery Sequences

Figure 4:
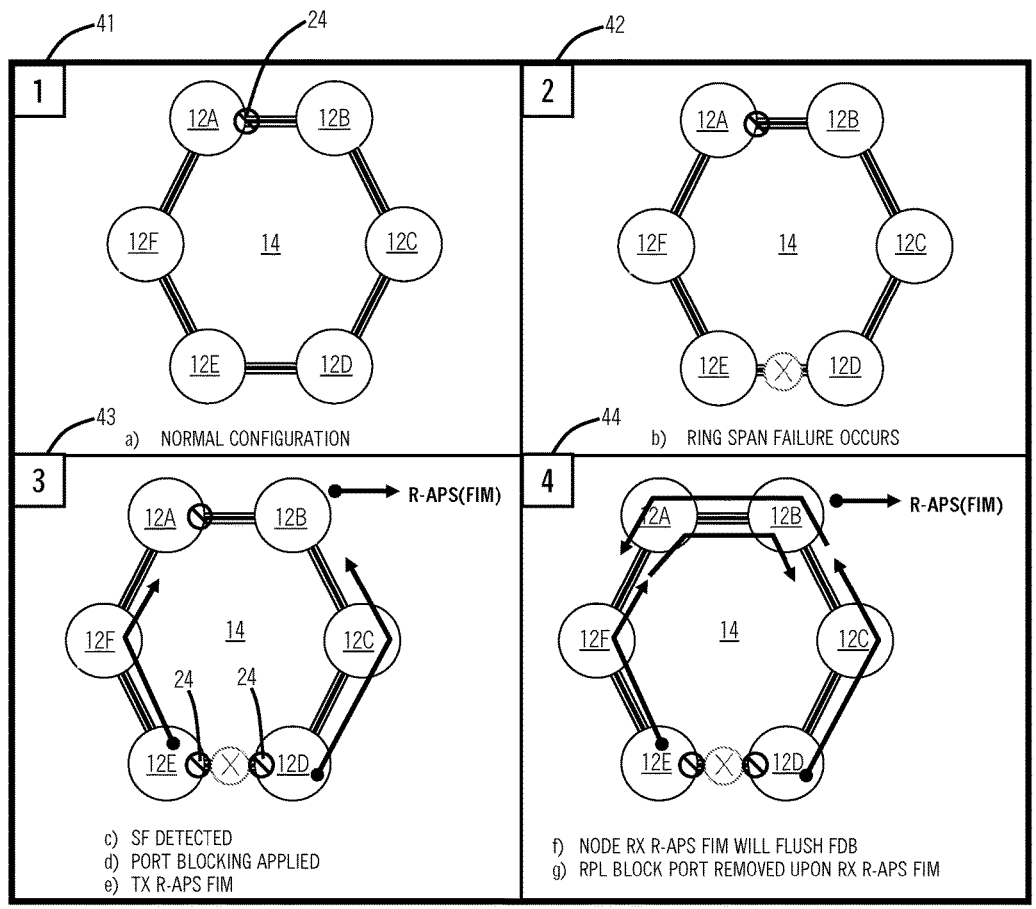
FIG. 4 is a network diagram of a G.8032 ring showing a failure sequence using G.8032 Ethernet Ring Protection on the nodes.

Referring to FIG. 4, in an exemplary embodiment, the G.8032 ring 14 is illustrated showing a failure sequence using G.8032 Ethernet Ring Protection on the nodes 12. At a first point 41 in FIG. 4, the ring 14 is operating in a normal configuration, i.e. no failures. In this example, the channel block 24 is at the node 12A facing the node 12B. At a point 42, a failure occurs on a ring span between the node 12E, 12D. At a point 43, a signal failure (SF) is detected on the ring, port blocking is applied at the nodes 12E, 12D via channel blocks 24, and R-APS Failure Indication Messages (FIM) are transmitted. At a point 44, each of the nodes 12 will receive the R-APS FIM and flush their current Forwarding Database (FDB) (MAC table) and the channel block 24 will be removed at the node 12A upon receipt of the R-APS SF. The FDB includes information which contains the routing configuration from the point of view of the current node. This process is performed for each virtual ring which is affected by the failure on a per virtual ring basis. Again, conventionally, there is no specific order for multiple virtual rings on a same node 12. In layer 2 switches, Layer 2 MAC addresses are learnt in the data path forwarding devices (e.g., Network Processors (NPU), Application Specific Integrated Circuits (ASICs), Field Programmable Gate Arrays (FPGAs). The nodes 12 detecting the failure need to flush the FDB on these devices on a per virtual ring basis.

Due to the failure, the nodes 12E, 12D (the nodes detecting the failure) are configured to implement the channel blocks 24 for each virtual ring over the failed link to block the traffic, flush the FDB for each virtual ring over the failed link, and generate the SF message for each virtual ring over the failed link to notify the other nodes 12A, 12B, 12C, 12F in the topology of the failure. Each of the nodes 12A, 12B, 12C, 12F that receive the SF message is configured to perform Layer 2 MAC table flush (FDB) for each virtual ring where the SF is received and to forward the SF towards the RPL node (i.e., the node 12A in this example such that the node 12A can remove its block).

Under G.8032, general protocol guidelines used to support protection switching within 50 ms are described in Sec. 7.3, Ethernet ring protection switching performance. Factors involved in the timing include 1) Time for a R-APS message to circulate an entire ring (i.e., ring circumference and nodal transit delays), 2) Time taken to install channel blocks, 3) Time taken to cleanse stale entries found in the FDB associated with Ring, and 4) Time taken to remove channel blocks.

Figure 5:
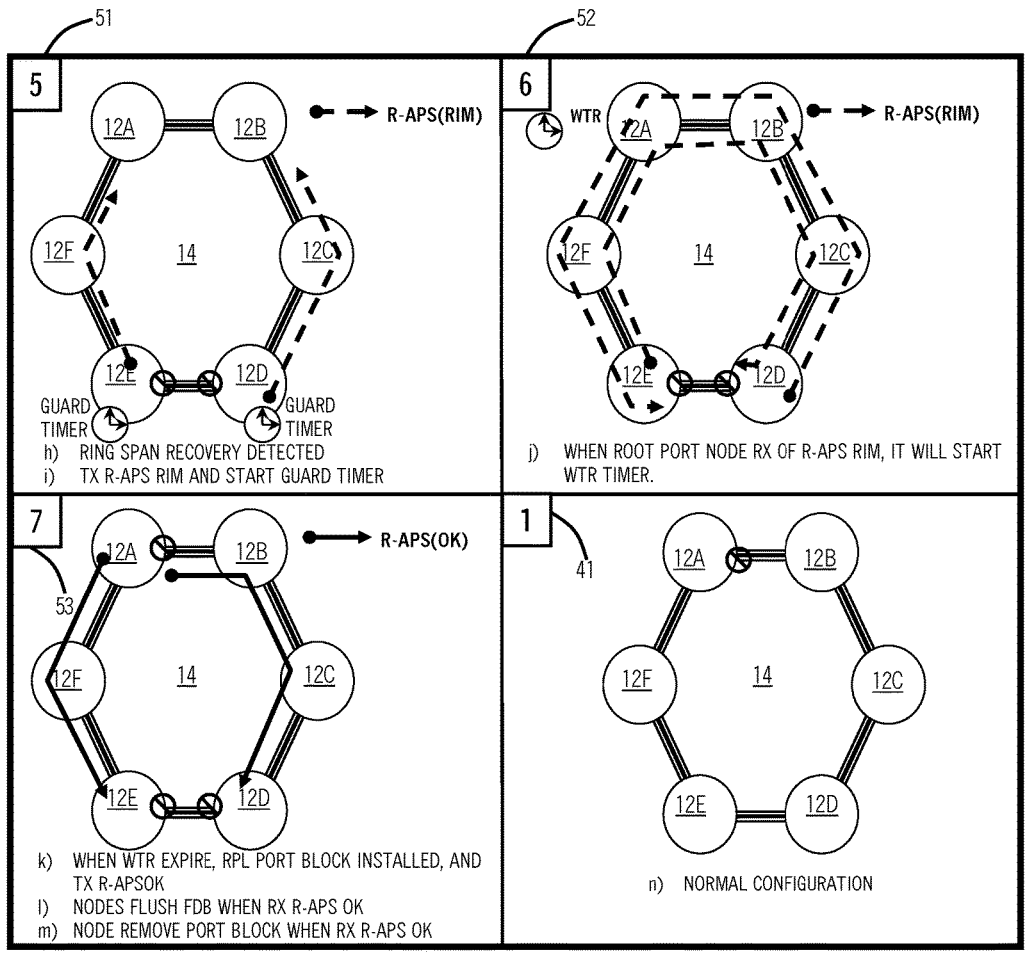
FIG. 5 is a network diagram of the G.8032 ring of FIG. 4 showing a recovery sequence using G.8032 Ethernet Ring Protection on the nodes.

Referring to FIG. 5, in an exemplary embodiment, the G.8032 ring 14 is illustrated showing a recovery sequence using G.8032 Ethernet Ring Protection on the nodes 12. The recovery sequence includes a recovery from the failure illustrated in FIG. 4 between the nodes 12D, 12E. At a point 51, a ring span recovery is detected between the nodes 12D, 12E and R-APS Recovery Indication Messages (RIM) are transmitted along with guard timers started at the nodes 12D, 12E. At a point 52, when a root port node receives the R-APS RIM, a wait-to-restore (WTR) timer is started. At a point 53, when the WTR expires, the RPL port block is installed at the nodes 12A and R-APS OK messages are transmitted. Also, each of the nodes 12 flush their FDB when the R-APS OK messages are received as well as removing port block such as at the nodes 12D, 12E when the R-APS OK messages are received.

G.8032 Rings with Plural Virtual Rings

Figure 6:
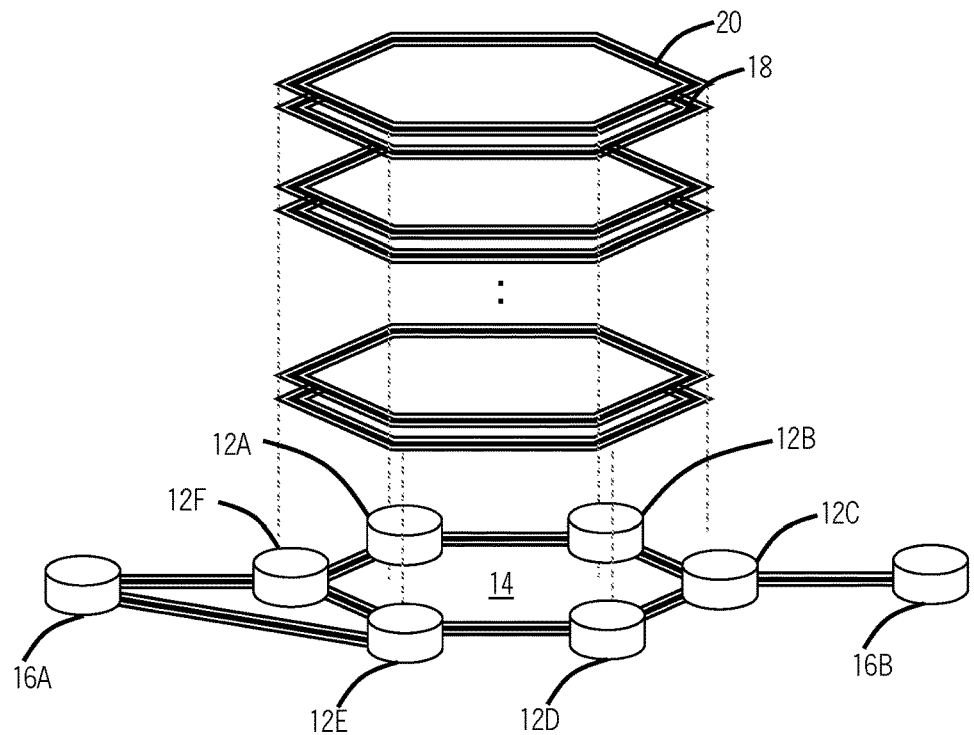
FIGS. 6 and 7 are network diagrams of a network with plural virtual rings each with separate Ring Automated Protection Switching (R-APS) channels (FIG. 6) and with a combined R-APS channel (FIG. 7)
Figure 7:
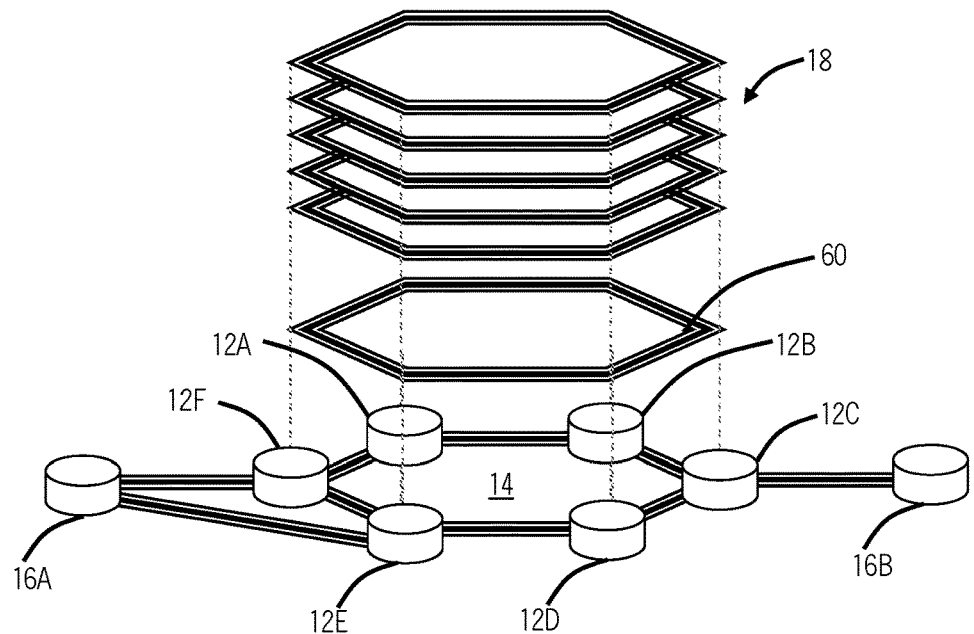

Referring to FIGS. 6 and 7, in an exemplary embodiment, the network 14 is illustrated with multiple virtual rings 22 each with separate R-APS channels 18 (FIG. 6) and with a combined R-APS channel 60 (FIG. 7). FIG. 6 illustrates typical G.8032 operation where each of the data channels 20 has a corresponding R-APS channel 18. In this exemplary embodiment of FIG. 6, assume there are N virtual rings 22 such that VR:Ring→N:1, where N≥1, the following associations apply to the G.8032 ring 14 of FIG. 6: Data Channel:VR→1:1; R-APS Channel:VR→1:1; and R-APS Channel:Ring→N:1, where N≥1. Let $X_1$ represent Virtual Local Area Network (VLAN) Identifiers (VID) $\{vid_{i1}, \ldots, vid_{j1}\}$ associated with $VR_1$, and let $X_n$ represent $\{vid_{an}, \ldots, vid_{bn}\}$ associated with $VR_n$, accordingly ($X_1 \not\subseteq X_n$) and ($X_1 \cap X_n = \emptyset$). In particular with G.8032, the channel block 24 location for the R-APS channel 18 and the service data channel 20 associated with a given virtual rings 22 need not be co-located at the same node 12. For example, channel blocks 24 on the service data channel 20 may be distributed across the G.8032 ring 14 to support load distribution and ring traffic engineering. Traffic bandwidth utilization associated with the R-APS channel 18 is very low, especially when compared to service data 20 traffic bandwidth utilization. Channel loop prevention for the R-APS channel 18 is guaranteed by VID filters against ingress/egress ports, or the ring node 12 sourcing the R-APS messages will be responsible for stripping the frame from the ring based upon R-APS SA (or R-APS Node Id), FIG. 7 illustrates the ring 14 with a single R-APS channel 60 for the plural virtual rings 22. The single R-APS channel 60 is a management channel that is shared by the plural virtual rings 22 while still operating according to the Ethernet Ring Protection protocol. In this exemplary embodiment, assume there are N virtual rings 22 such that VR:Ring→N:1, where N≥1: the following associations apply to the G.8032 ring 14 of FIG. 7: Data Channel:VR→1:1, R-APS Channel:Ring→1:1. Let $X_1$ represent $\{vid_{i1}, \ldots, vid_{j1}\}$ associated with $VRing_1$, let $X_n$ represent $\{vid_{an}, \ldots, vid_{bn}\}$ associated with $VR_n$, and let Y represent $\{vid_y\}$ associated with the G.8032 ring 14, accordingly the G.8032 ring 14 of FIG. 7 exhibits the following characteristics ⇒ ($X_1 \not\subseteq X_n$) and ($X_1 \cap X_n = \emptyset$) and ($Y \not\subseteq X_1$) and ($Y \not\subseteq X_n$). Each of the virtual rings 22 has its own service data channel 20 which share the single R-APS channel 60 that manages/controls all virtual rings 22 associated with G.8032 ring 14. In particular, the nodes 12 that have an R-APS channel block active (i.e., installed) will be responsible for transmitting the R-APS messages for all of the virtual rings 22, and message summarization techniques may be applied. The virtual ring 22 service data channel 20 blocks 24 are distributed across the G.8032 ring 14 as needed. The nodes 12 that own a virtual ring 22 service data channel 20 block 24 include "VR instance" information into the R-APS OK messages that are in transit. R-APS FIM/RIM messages contain information associated with all "VR instances." Accordingly, the nodes 12 (associated with a virtual ring 22) will only process R-APS messages that are in transit, if it contains "VR instance" information that it is configured with.

G.8032 Rings with Plural Virtual Rings and Ordered Restoration

Figure 8:
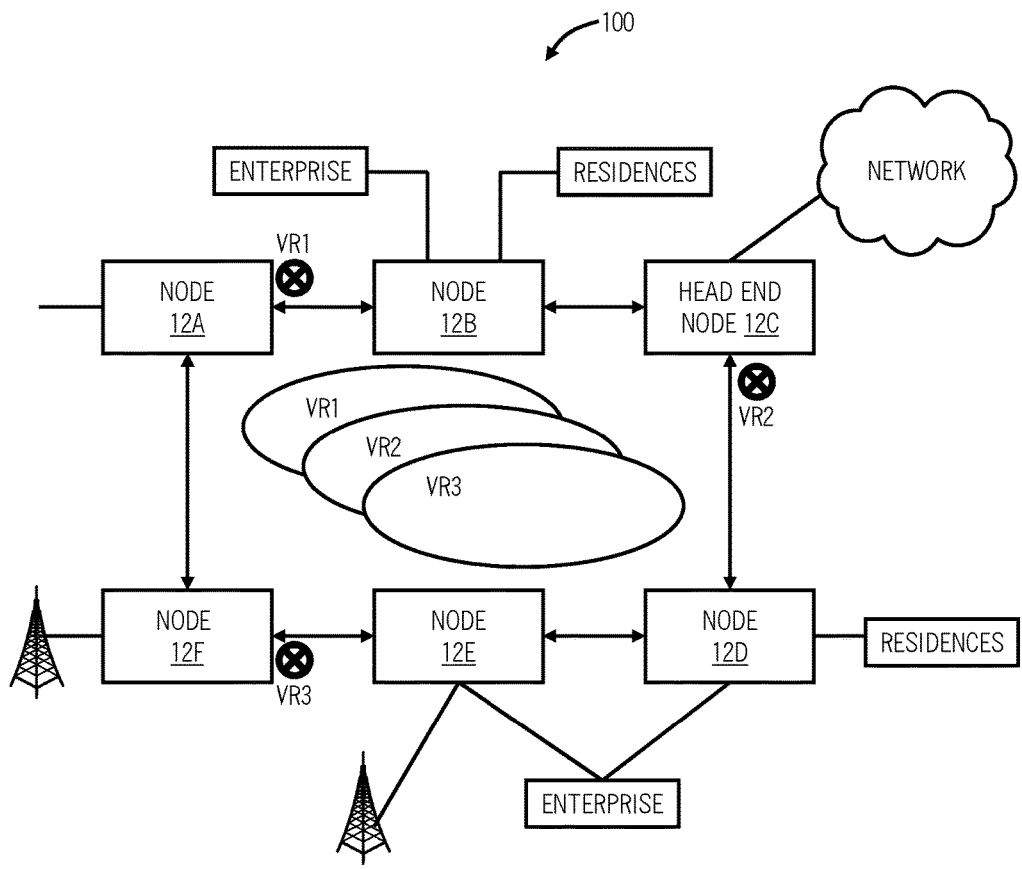
FIG. 8 is a network diagram of a network with three virtual rings between nodes.

Referring to FIG. 8, in an exemplary embodiment, a network diagram illustrates a network 100 with three virtual rings VR1, VR2, VR3 between nodes 12A-12F. Again, in G.8032 based Layer 2 networks, it is possible that multiple Virtual Rings (VRs) are created over logical rings that share the same physical path in the network 100. When a link failure occurs, virtual ring performs its own traffic restoration as described herein. There is no fixed order in which the node 12 detecting the link failure will try to restore the traffic for different virtual rings created over the failed link. Conventionally, as a result, the pattern in which services restore traffic is not predictable and in a non-ordered manner, i.e., there is no prioritization of services in which traffic will get restored. As a result of which services that has low priority can get its traffic restored earlier than higher priority services.

The network 100 is presented for illustrating the systems and methods for prioritized ring switching, i.e., ordered restoration. Assume the three virtual rings VR1, VR2, VR3 have the identical physical path, but the channel blocks are located at different nodes as illustrated in FIG. 8. Again, for illustration purposes, assume the VR1 is for mobile backhaul and has a medium priority, the VR2 is for home Internet and has low priority, and the VR3 is for business services and has high priority.

Figure 9:
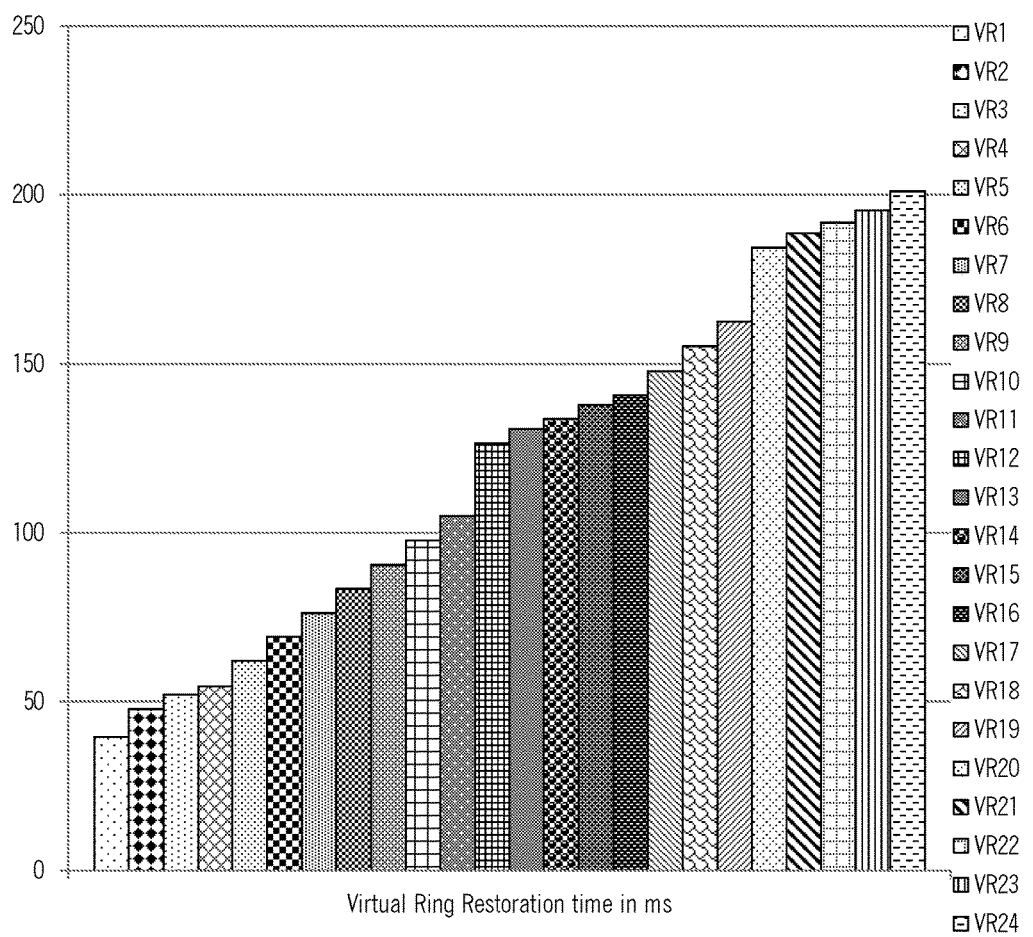
FIG. 9 is a graph of experimental data showing conventional traffic restoration time in G.8032 on the network with a total of 24 virtual rings.

Conventionally, when a link failure occurs in the network 100, there is no mechanism to determine an order based on priority in which the virtual rings initiate and perform the protection switch. As a result, the virtual rings VR1, VR2 that are carrying lower priority services might traffic restored earlier than the virtual ring VR3 that is carrying higher priority services. Also, conventionally, virtual ring restoration is done sequentially—one after the other, resulting in a linear increasing pattern for restoration time. Referring to FIG. 9, in an exemplary embodiment, a graph illustrates experimental data showing conventional traffic restoration time in G.8032 on the network 100 with a total of 24 virtual rings. Again, the conventional traffic restoration is sequential and non-ordered. Based on the experimental data traffic restoration takes from 39.5 ms to 201.0 ms and the mean restoration time is 119.75 ms. This convention traffic restoration approach does not account for priority and is exceptionally large for a node 12 with multiple virtual rings, i.e., 24.

Figure 10:
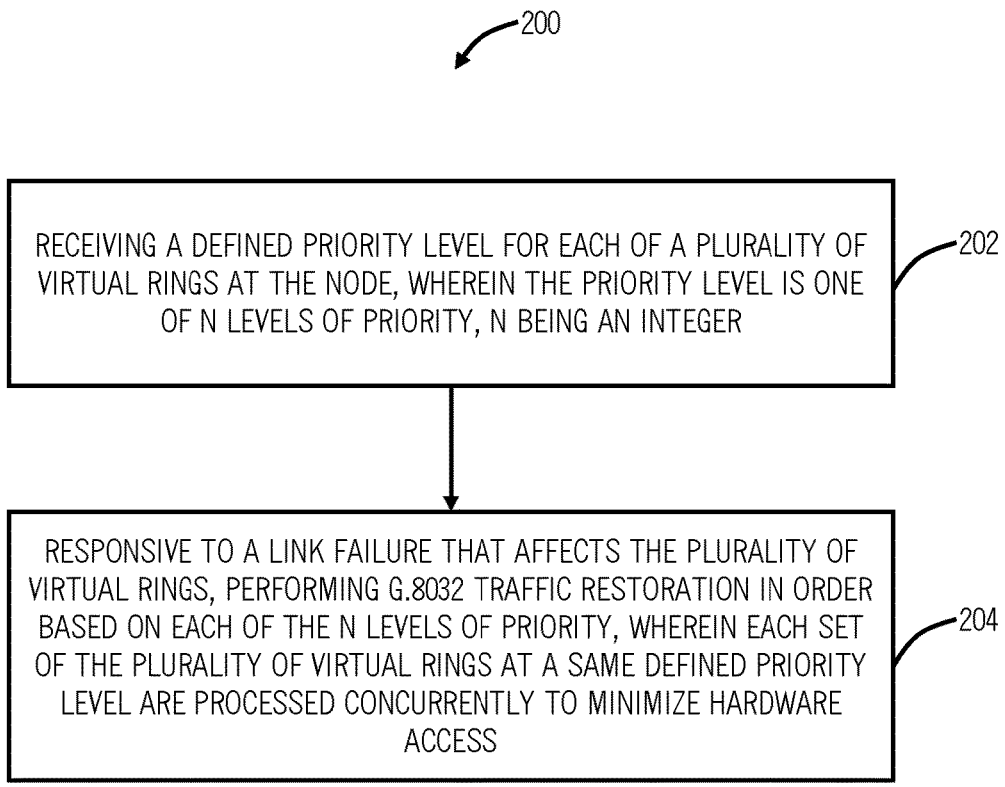
FIG. 10 is a flowchart of a prioritized G.8032 ring switching process implemented in a node.

Referring to FIG. 10, in an exemplary embodiment, a flowchart illustrates a prioritized G.8032 ring switching process 200 implemented in a node. The ring switching process 200 includes receiving a defined priority level for each of a plurality of virtual rings at the node, wherein the priority level is one of N levels of priority, N being an integer (step 202); and, responsive to a link failure that affects the plurality of virtual rings, performing G.8032 traffic restoration in order based on each of the N levels of priority, wherein each set of the plurality of virtual rings at a same defined priority level are processed concurrently to minimize hardware access (step 204).

The set of the plurality of virtual rings is processed concurrently through flushing their Forwarding Databases at the same time for each of the set on a per virtual ring basis. The receiving step 202 is via a Ring Automated Protection Switching (R-APS) Protocol Data Unit (PDU) for each virtual ring with the defined priority level included therein. The R-APS PDU can include a flag indicative of a last virtual ring in the set, and wherein the node is configured to perform the traffic restoration for all of the set subsequent to receiving the R-APS PDU from the last virtual ring. The set of the plurality of virtual rings can be processed concurrently to minimize hardware access to flush a Forwarding Database in a one or more of a Network Processor, an Application Specific Integrated Circuit, and a Field Programmable Gate Array.

Optionally, the node is adjacent to the link failure, and the performing step 204 includes installing a channel block on a link with the link failure for each virtual ring affected by the link failure; generating a Ring Automated Protection Switching (R-APS) Protocol Data Unit (PDU) for each virtual ring in a first priority level with the defined priority level included therein and including a flag in a last R-APS PDU for a last virtual ring in the first priority level; flushing a Forwarding Database for each virtual ring in the first priority level concurrently in a single operation; and repeating the generating and the flushing for each additional priority level in order.

Alternatively, the node is non-adjacent to the link failure, and the performing step 204 includes removing a channel block on any associated link if provisioned for each virtual ring affected by the link failure; retransmitting any messages indicating the link failure for each virtual ring affected by the link failure towards a Ring Protection Link (RPL) node if the node is not the RPL node; subsequent to the receiving indicating a last virtual ring in a set of virtual rings at a set priority level, flushing a Forwarding Database for each virtual ring in the set priority level concurrently in a single operation. One or more of the plurality of virtual rings can be in one or more Link Aggregation Groups (LAGs).

In another exemplary embodiment, a prioritized G.8032 ring switching apparatus in a node includes circuitry adapted to receive a defined priority level for each of a plurality of virtual rings at the node, wherein the priority level is one of N levels of priority, N being an integer; and circuitry adapted to perform G.8032 traffic restoration in order based on each of the N levels of priority responsive to a link failure that affects the plurality of virtual rings, wherein each set of the plurality of virtual rings at a same defined priority level are processed concurrently to minimize hardware access.

In a further exemplary embodiment, a node adapted to perform prioritized G.8032 ring switching includes a plurality of ports adapted to switch packets between one another; and a controller configured to receive a defined priority level for each of a plurality of virtual rings at the node on a port of the plurality of ports, wherein the priority level is one of N levels of priority, N being an integer, and perform G.8032 traffic restoration in order based on each of the N levels of priority responsive to a link failure on the port that affects the plurality of virtual rings, wherein each set of the plurality of virtual rings at a same defined priority level are processed concurrently to minimize hardware access.

Priority Levels

Various approaches are contemplated for the defined priority levels, namely any mechanism to differentiate one virtual ring from another. At the creation of a virtual ring, a default priority can be assigned as well as adjusted later. Network operators can assign the priority level based on business needs, Service Layer Agreements (SLAs), traffic importance, etc. In an exemplary embodiment, the priority can be in a range of 0-65535. A lower numerical value could indicate a higher priority, e.g., a priority of 128 is higher than one of 512. Of course, other embodiments are also contemplated. In FIG. 8, assume the virtual rings VR1, VR2, VR3 are assigned the following priorities.

| Virtual Ring | Service type | Traffic priority in network | Traffic restoration priority |
| --- | --- | --- | --- |
| VR 1 | Mobile backhaul | Middle priority | 256 |
| VR 2 | Home internet | Lower priority | 512 |
| VR 3 | Business services | Highest priority | 128 |

Here, VR3 would have the highest defined priority with VR1 second and VR2 last. The priority again is defined on a per virtual ring basis, and by default, for example, a virtual ring can be designated at the lowest priority.

Flushing Forwarding Databases

Again, the graph in FIG. 9 illustrates conventional, non-ordered restoration. Conventionally, each node performs a Layer 2 MAC flush equal to the number of virtual rings affected thereon. The systems and methods propose to perform a Layer 2 MAC flush equal to the number of different priority levels with affected virtual rings therein. That is, all virtual rings at a set priority level have their associated Forwarding Database flushed together. The Layer 2 MAC flush operation is generally quite slow especially in hardware on NPUs, ASICs, FPGAs, etc. Multiple flush operations, i.e., one per virtual ring, slow down the overall traffic restoration process as illustrated in FIG. 9.

Accordingly, the ring switching process 200 includes a mechanism to access the hardware (e.g., NPU, ASIC, FPGA, etc.) to flush the Forwarding Database on a per virtual ring basis for a group of virtual rings at the same priority level at the same time. This results in less hardware access times which results in overall traffic restoration time reduction. Back in FIG. 8, assume there are now nine virtual rings instead of three. Again, conventionally, when protection switch happens each node 12 will need to flush the FDB on a per virtual ring basis resulting in the flushing performed nine times, one for each virtual ring that results in a great deal of time spent in flushing the FDB.

To provide efficiency, the ring switching process 200 performs a flushing operation for all virtual rings at a specific priority level at the same time. Using the example above with nine virtual rings, assume they have the following priority levels:

| Virtual Ring | Service type | Traffic priority in network | Traffic restoration priority |
| --- | --- | --- | --- |
| VR 11 | Mobile backhaul 1 | Middle priority | 256 |
| VR 21 | Home internet 1 | Lower priority | 512 |
| VR 31 | Business services 1 | Highest priority | 128 |
| VR 12 | Mobile backhaul 2 | Middle priority | 256 |
| VR 22 | Home internet 2 | Lower priority | 512 |
| VR 32 | Business services 3 | Highest priority | 128 |
| VR 13 | Mobile backhaul 3 | Middle priority | 256 |
| VR 23 | Home internet 2 | Lower priority | 512 |
| VR 33 | Business services 3 | Highest priority | 128 |

Note, there are nine virtual rings, but only three levels of priority—128, 256, and 512 and flushing for virtual rings at the same priority level shall be performed collectively. Accordingly, what previously took nine flush operations will now only be performed three times instead of getting performed nine times. This saves excessive time in flushing at hardware as a result of which protection switch times for all the virtual rings improves.

Figure 11:
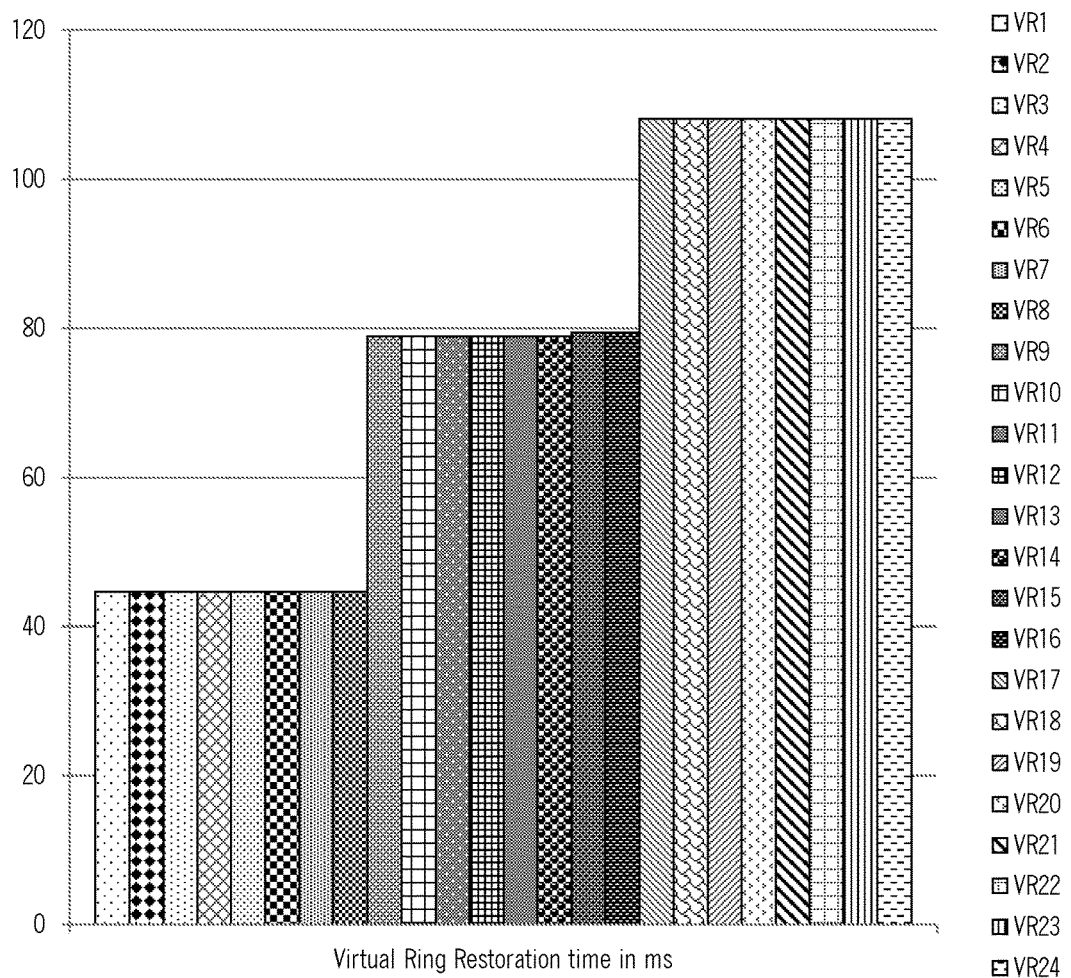
FIG. 11 is a graph of experimental data showing traffic restoration time in G.8032 on the network with a total of 24 virtual rings using the ring switching process of FIG. 10.

Referring to FIG. 11, in an exemplary embodiment, a graph illustrates experimental data showing traffic restoration time in G.8032 on the network 100 with a total of 24 virtual rings using the ring switching process 200. Specifically, FIG. 11 shows the same network and set of virtual rings as FIG. 9. Here, there are 24 virtual rings at three different priority levels—eight virtual rings are of highest priority (128), the next eight virtual rings with middle priority (256), and the last eight virtual rings with the lowest priority (512). As can be seen in FIG. 11, the resulting ring restoration time is faster by up to 35%. Here, the mean restoration time after optimization, in this case, is 77.25 ms in comparison to 119.75 ms without this optimization in FIG. 9.

R-APS PDU

Figure 12:
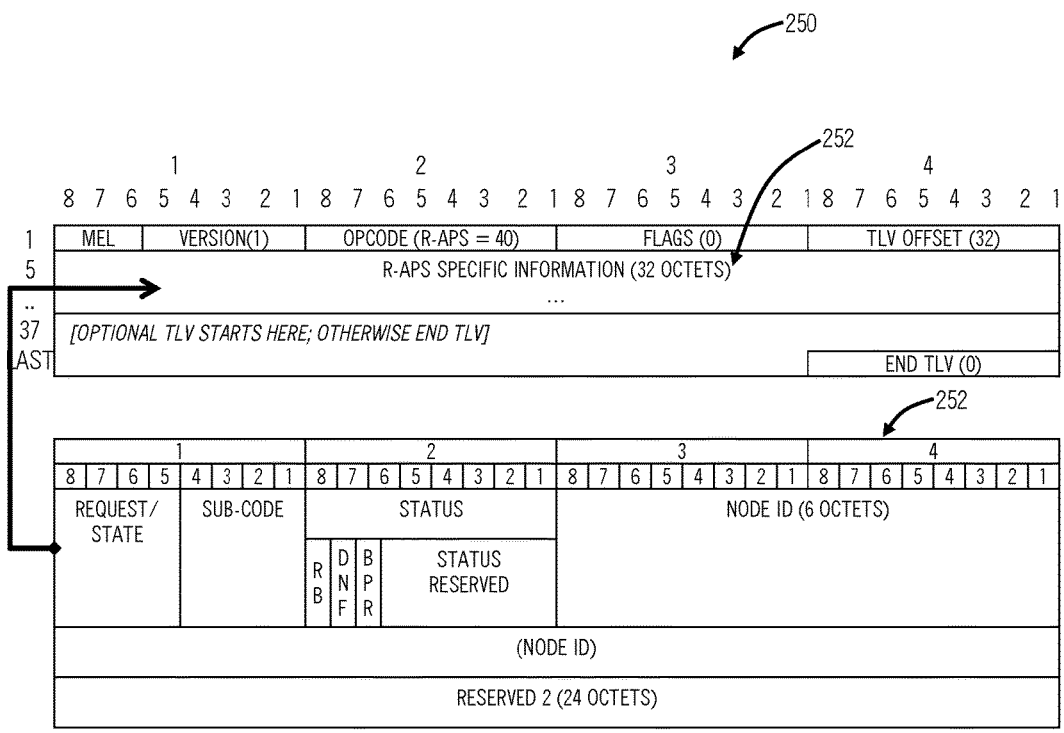
FIG. 12 is a block diagram of an R-APS Protocol Data Unit (PDU)
Figure 13:
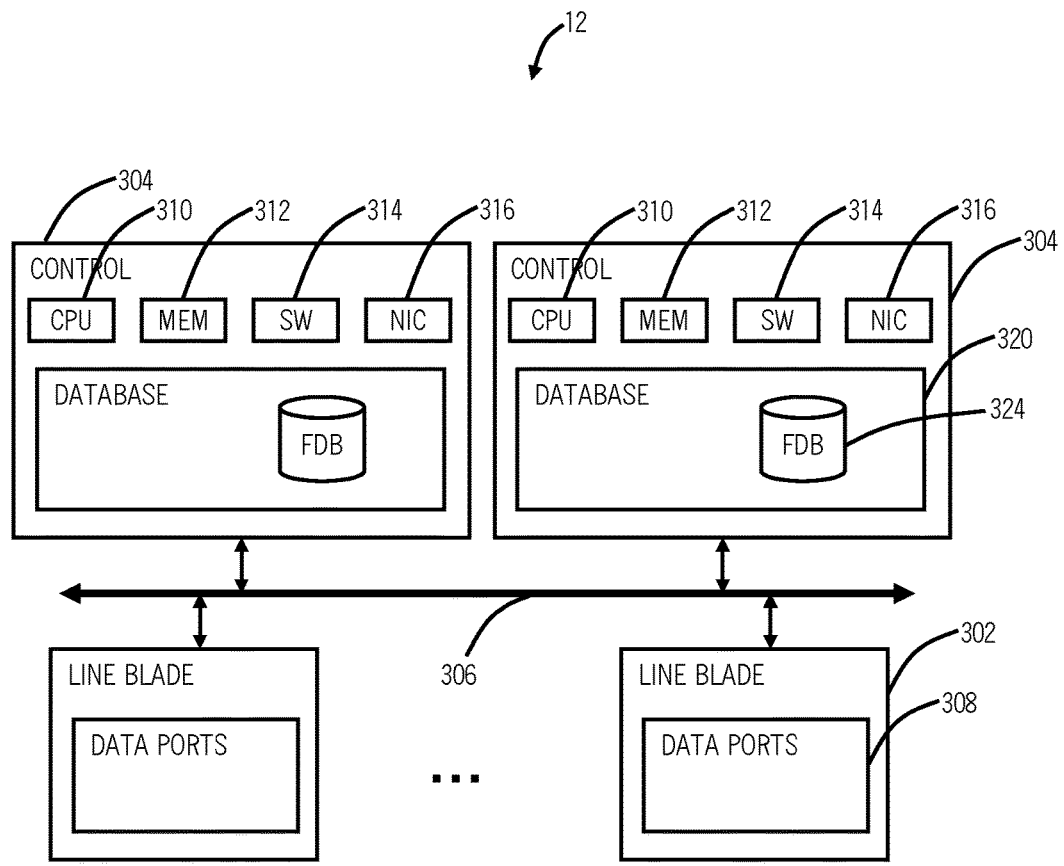
FIG. 13 is a block diagram of an exemplary implementation of the node.

Referring to FIG. 12, in an exemplary embodiment, a block diagram illustrates an R-APS PDU 250. The PDU 250 includes a Maintenance Entity Group (MEG) Level (MEL) which is a 3-bit field containing an integer value (0 to 7) that identifies the MEG Level of the PDU 250. A Version field is a 5-bit field containing an integer value that identifies the OAM protocol version. An OpCode is a 1-octet field containing an OpCode that identifies an OAM PDU type, and in the case of the R-APS PDU 250 is set to 40. The OpCode is used to identify the remaining content of an OAM PDU. A Flag field is an 8-bit field dependent on the OAM PDU type, and in the case of the R-APS PDU 250 is set to all zeros. TLV Offset is a 1-octet field containing the offset to the first TLV in an OAM PDU relative to the TLV Offset field. The value of this field is associated with an OAM PDU type. In the case of the R-APS PDU 250, the TLV Offset is 32 indicating the TLVs start after R-APS information 252.

The R-APS PDU 250 and the R-APS information 252 are used for Ethernet Operations Administration and Maintenance (OAM) and are defined in IEEE 802.1ag "Connectivity Fault Management" (September 2007) and G.8032. The R-APS information 252 includes a request/state, e.g., Forced Switch, Event, Signal Fail, Manual Switch, etc. In the case of the link failure here, the request/state will be Signal Fail (SF). The Sub-Code can be a flush request in the case of the SF. The Status field includes an RPL Blocked (RB) to indicate if the RPL is blocked, a Do Not Flush (DFB) to trigger flushing, and a Blocked Port Reference (BPR). The Node ID is a MAC address unique to the node, and the R-APS information 252 includes reserved fields for future extensions.

In addition to the standard content of the R-APS information 252 described above, the ring switching process 200 proposes to add a new TLV included in the R-APS PDU 250, such as an Organization Specific TLV. This new TLV can include priority levels and a flag indicative of this virtual ring being the last one of a given priority level. An exemplary TLV for priority in the R-APS PDU 250 can include:

| TLV field | Information carried | Size in Bytes |
| --- | --- | --- |
| Type = 31 | Organizational specific TLV | 1 byte |
| Length | Length of TLV value | 3 bytes |
| OUI | Organizationally Unique Identifier obtainable from IEEE | 3 bytes |
| Sub Type | Sub Type shall be implementation specific depending on a number of organization specific TLVs. | 1 byte |
| Message Type | VIRTUAL_RING_PRIORITY: Indicates this message contains information of "virtual ring traffic restoration priority" to perform prioritized and faster traffic protection switch | 1 byte |
| Virtual ring priority | Traffic restoration priority of virtual ring for which protection switch mechanism is being performed. | 2 bytes |
| Flags | Bit 0 (last VR): This flag shall be set by the node detecting the ring failure for last virtual ring of given priority. Bit (1-7): Reserved. | 1 byte |

The Last VR flag shall be set to 0 when there are more virtual rings of the same priority for which R-APS SF PDUs still require generation, and it shall be set to 1 when it is the last virtual ring of the same priority for which R-APS SF PDU is generated.

In the example above with nine VRs at three sets of priority, the R-APS PDUs 250 are generated by the node 12 detecting the link failure in the following order with the Last VR Flag set as follows:

| VR | Service type | Traffic priority in network | Traffic restoration priority | Last VR flag |
| --- | --- | --- | --- | --- |
| VR 31 | Business services 1 | Highest priority | 128 | 0 |
| VR 32 | Business services 2 | Highest priority | 128 | 0 |
| VR 33 | Business services 3 | Highest priority | 128 | 1 |
| VR 21 | Mobile backhaul 1 | Middle priority | 256 | 0 |
| VR 22 | Mobile backhaul 2 | Middle priority | 256 | 0 |
| VR 23 | Mobile backhaul 3 | Middle priority | 256 | 1 |
| VR 31 | Home internet 1 | Lower priority | 512 | 0 |
| VR 32 | Home internet 2 | Lower priority | 512 | 0 |
| VR 33 | Home internet 3 | Lower priority | 512 | 1 |

When a node receives the R-APS PDU 250 with SF request with above proprietary TLV, it shall take following actions: in case "Last VR" flag is not set store the virtual ring identifier in its cache, and in case "Last VR" flag is set, retrieve the virtual ring identifiers stored in its cache and perform the flush on the hardware for virtual ring identifiers stored in cache and virtual ring for which R-APS PDU 300 is received in single operation. This combines multiple flush requests in hardware into one single request to the hardware for a group of virtual rings that have the same priority. In the above table, flushing will take place in hardware only three times when R-APS PDUs 300 for VR33, VR23, and VR13 are received. This will reduce the overall reduction in flush times and will allow faster restoration of traffic.

Exemplary Node

Referring to FIG. 9, in an exemplary embodiment, a block diagram illustrates an exemplary implementation of a node 12. In this exemplary embodiment, the node 12 is an Ethernet network switch, but those of ordinary skill in the art will recognize the ring switching process 200 contemplates operation in other types of network elements and other implementations, such as, for example, a layer two switch integrated within an optical network element.

In this exemplary embodiment, the node 12 includes a plurality of blades 302, 304 interconnected via an interface 306. The blades 302, 304 are also known as line cards, line modules, circuit packs, pluggable modules, etc. and generally refer to components mounted within a chassis, shelf, etc. of a data switching device, i.e. the node 12. In another exemplary embodiment, the functionality of each of the blades 302, 304 may be integrated into a single module, such as in the layer two switch integrated within an optical network element or a single integrated unit, i.e., a "pizza box." Each of the blades 302, 304 may include numerous electronic devices and optical devices mounted on a circuit board along with various interconnects including interfaces to the chassis, shelf, etc.

Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the node 12 out by the correct port 308 to the next network element. "Switching fabric" includes switching units, or individual boxes, in a node; integrated circuits contained in the switching units; and programming that allows switching paths to be controlled.

Within the context of the ring switching process 200, the control blades 304 include a microprocessor 310, memory 312, software 314, and a network interface 316 to control packet switching. Specifically, the microprocessor 310, the memory 312, and the software 314 may collectively control, configure, provision, monitor, etc. the node 12. The network interface 316 may be utilized to communicate with an element manager, an NMS, etc. Additionally, the control blades 304 may include a database 320 that tracks and maintains provisioning, configuration, operational data and the like. The database 320 may include a forwarding database (FDB) 322 and/or a MAC table that is used for MAC learning and flushing in the ring switching process 200. In this exemplary embodiment, the node 12 includes two control blades 304 which may operate in a redundant or protected configuration such as 1:1, 1+1, etc.

In general, the control blades 304 maintain dynamic system information including Layer two forwarding databases, protocol state machines, and the operational status of the ports 308 within the node 12. In an exemplary embodiment, the blades 302, 304 are configured to implement a G.8032 ring, and to implement the various processes, algorithms, methods, mechanisms, etc. described herein for implementing the ring switching process 200.

Those of ordinary skill in the art will recognize the node 12 can include other components which are omitted for illustration purposes, and that the systems and methods described herein are contemplated for use with a plurality of different network elements with the node 12 presented as an exemplary type of network element. For example, in some embodiments, the line blades 302 and the control blades 304 can be implemented as a single module. In general, the systems and methods described herein contemplate use with any network element providing packet switching. Furthermore, the node 12 is merely presented as one exemplary device for the systems and methods described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A prioritized G.8032 ring switching method implemented in a node, the ring switching method comprising:
receiving a defined priority level for each of a plurality of virtual rings at the node, wherein the priority level is one of N levels of priority, N being an integer, wherein the receiving is via a Ring Automated Protection Switching (R-APS) Protocol Data Unit (PDU) for each virtual ring with the defined priority level included therein as a field inside the R-APS PDU; and
responsive to a link failure that affects the plurality of virtual rings, performing G.8032 traffic restoration in order based on each of the N levels of priority, wherein there are a plurality of sets of virtual rings and each set of the plurality of virtual rings is at a same defined priority level and all virtual rings in a corresponding set are processed concurrently to minimize hardware access,
wherein the field is a Type-Length-Value (TLV) comprising the defined priority level and a flag indicating whether a particular virtual ring is a last virtual ring in the corresponding set to enable the set to be processed concurrently.

2. The ring switching method of claim 1, wherein each set of the plurality of virtual rings is processed concurrently through flushing their Forwarding Databases at a same time for each of the set on a per virtual ring basis.

3. The ring switching method of claim 1, wherein the node is configured to perform the traffic restoration for all virtual rings in a corresponding set subsequent to receiving the R-APS PDU from the last virtual ring in the corresponding set.

4. The ring switching method of claim 1, wherein the node is adjacent to the link failure, and the performing comprises:

installing a channel block on a link with the link failure for each virtual ring affected by the link failure;

generating a Ring Automated Protection Switching (R-APS) Protocol Data Unit (PDU) for each virtual ring in a first priority level with the defined priority level included therein and including a flag in a last R-APS PDU for a last virtual ring in the first priority level;

flushing a Forwarding Database for each virtual ring in the first priority level concurrently in a single operation; and repeating the generating and the flushing for each additional priority level in order.

5. The ring switching method of claim 1, wherein the node is non-adjacent to the link failure, and the performing comprises:

removing a channel block on any associated link if provisioned for each virtual ring affected by the link failure;

retransmitting any messages indicating the link failure for each virtual ring affected by the link failure towards a Ring Protection Link (RPL) node if the node is not the RPL node; and subsequent to the receiving indicating the last virtual ring in a corresponding set of the plurality of sets of virtual rings at a set priority level, flushing a Forwarding Database for each virtual ring in the set priority level concurrently in a single operation.

6. The ring switching method of claim 1, wherein all virtual rings in a corresponding set of the plurality of virtual rings are processed concurrently to minimize hardware access to flush a Forwarding Database in a one or more of a Network Processor, an Application Specific Integrated Circuit, and a Field Programmable Gate Array.

7. The ring switching method of claim 1, wherein one or more of the plurality of virtual rings are in one or more Link Aggregation Groups (LAGs).

8. A prioritized G.8032 ring switching apparatus in a node, the prioritized G.8032 ring switching apparatus comprising:

circuitry adapted to receive a defined priority level for each of a plurality of virtual rings at the node, wherein the priority level is one of N levels of priority, N being an integer, wherein the defined priority level is included as a field inside a Ring Automated Protection Switching (R-APS) Protocol Data Unit (PDU) for each virtual ring; and circuitry adapted to perform G.8032 traffic restoration in order based on each of the N levels of priority responsive to a link failure that affects the plurality of virtual rings, wherein there are a plurality of sets of virtual rings and each set of the plurality of virtual rings is at a same defined priority level and all virtual rings in a corresponding set are processed concurrently to minimize hardware access, wherein the field is a Type-Length-Value (TLV) comprising the defined priority level and a flag indicating whether a particular virtual ring is a last virtual ring in the set to enable the corresponding set to be processed concurrently.

9. The prioritized G.8032 ring switching apparatus of claim 8, wherein the set of the plurality of virtual rings are processed concurrently through flushing their Forwarding Databases at a same time for each of the set on a per virtual ring basis.

10. The prioritized G.8032 ring switching apparatus of claim 8, wherein the circuitry adapted to perform is configured to perform the traffic restoration for all virtual rings of a corresponding set subsequent to receiving the R-APS PDU from the last virtual ring in the set.

11. The prioritized G.8032 ring switching apparatus of claim 8, wherein the node is adjacent to the link failure, and the circuitry adapted to perform is adapted to install a channel block on a link with the link failure for each virtual ring affected by the link failure, generate a Ring Automated Protection Switching (R-APS) Protocol Data Unit (PDU) for each virtual ring in a first priority level with the defined priority level included therein and including a flag in a last R-APS PDU for a last virtual ring in the first priority level, flush a Forwarding Database for each virtual ring in the first priority level concurrently in a single operation, and repeat generation and flushing for each additional priority level in order.

12. The prioritized G.8032 ring switching apparatus of claim 8, wherein the node is non-adjacent to the link failure, and the circuitry adapted to perform is adapted to remove a channel block on any associated link if provisioned for each virtual ring affected by the link failure, retransmit any messages indicating the link failure for each virtual ring affected by the link failure towards a Ring Protection Link (RPL) node if the node is not the RPL node, and subsequent to receiving an indication of the last virtual ring in a corresponding set of virtual rings at a set priority level, flush a Forwarding Database for each virtual ring in the set priority level concurrently in a single operation.

13. The prioritized G.8032 ring switching apparatus of claim 8, wherein all virtual rings in a corresponding set of the plurality of virtual rings are processed concurrently to minimize hardware access to flush a Forwarding Database in a one or more of a Network Processor, an Application Specific Integrated Circuit, and a Field Programmable Gate Array.

14. A node adapted to perform prioritized G.8032 ring switching, the node comprising:

a plurality of ports adapted to switch packets between one another; and a controller configured to receive a defined priority level for each of a plurality of virtual rings at the node on a port of the plurality of ports, wherein the priority level is one of N levels of priority, N being an integer, wherein the defined priority level is included as a field inside a Ring Automated Protection Switching (R-APS) Protocol Data Unit (PDU) for each virtual ring, and perform G.8032 traffic restoration in order based on each of the N levels of priority responsive to a link failure on the port that affects the plurality of virtual rings, wherein there are a plurality of sets of virtual rings and each set of the plurality of virtual rings is at a same defined priority level and all virtual rings in a corresponding set are processed concurrently to minimize hardware access, wherein the field is a Type-Length-Value (TLV) comprising the defined priority level and a flag indicating whether a particular virtual ring is a last virtual ring in the corresponding set to enable the set to be processed concurrently.

15. The node of claim 14, wherein each set of the plurality of virtual rings is processed concurrently through flushing their Forwarding Databases at a same time for each of the set on a per virtual ring basis.

16. The node of claim 14, wherein the node is adjacent to the link failure, and the controller is adapted to
- install a channel block on a link with the link failure for each virtual ring affected by the link failure,
- generate a Ring Automated Protection Switching (R-APS) Protocol Data Unit (PDU) for each virtual ring in a first priority level with the defined priority level included therein and including a flag in a last R-APS PDU for a last virtual ring in the first priority level,
- flush a Forwarding Database for each virtual ring in the first priority level concurrently in a single operation, and
- repeat generation and flushing for each additional priority level in order.

17. The node of claim 14, wherein the node is non-adjacent to the link failure, and the controller is adapted to
- remove a channel block on any associated link if provisioned for each virtual ring affected by the link failure,
- retransmit any messages indicating the link failure for each virtual ring affected by the link failure towards a Ring Protection Link (RPL) node if the node is not the RPL node, and
- subsequent to receiving an indication of the last virtual ring in a corresponding set of virtual rings at a set priority level, flush a Forwarding Database for each virtual ring in the set priority level concurrently in a single operation.

* * * * *